UNITED STATES PATENT OFFICE.

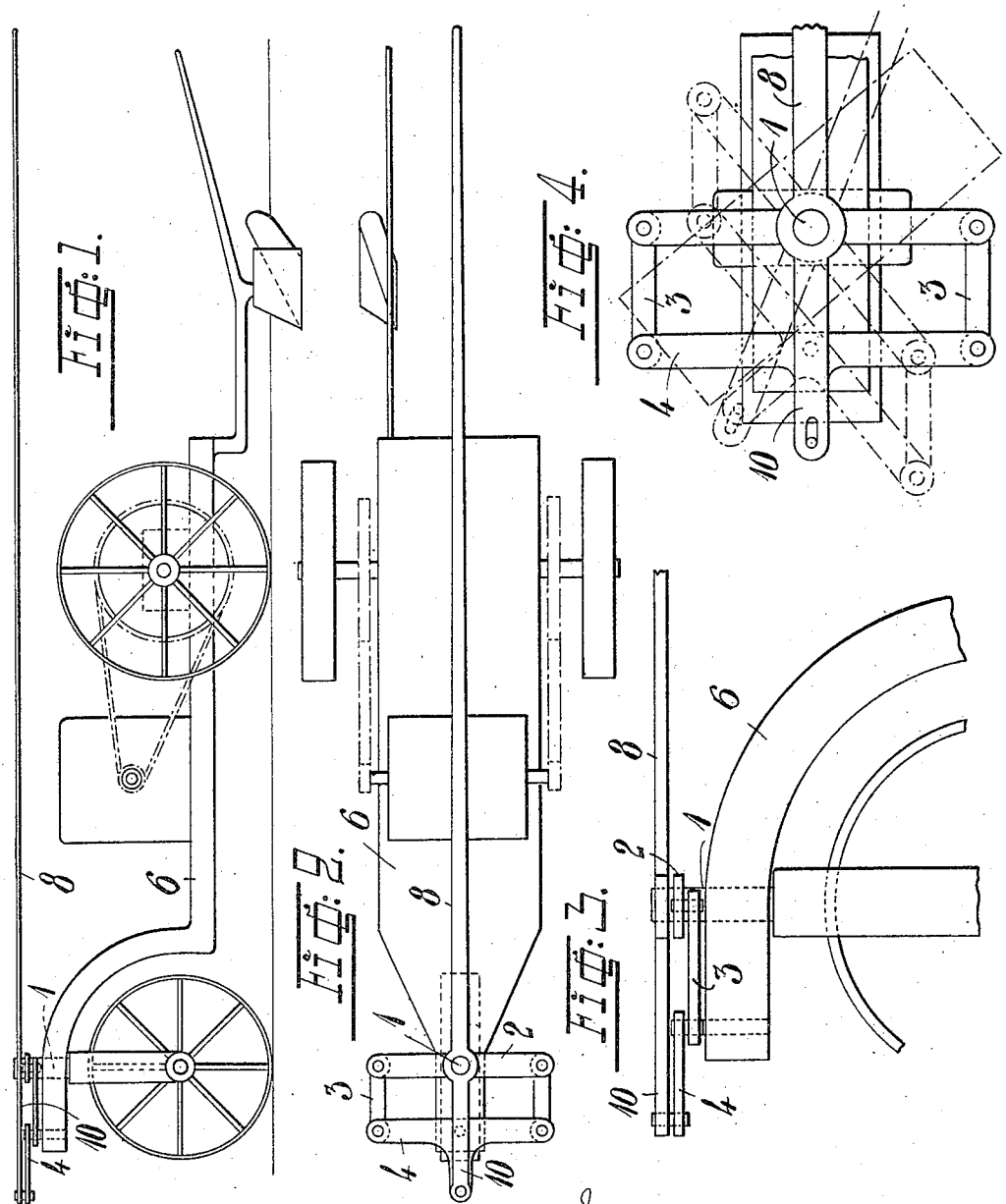

DAVID WERNER BERLIN, OF STOCKHOLM, AND OTTO EDVARD HULTBERG, OF GULDSMEDSHYTTAN, SWEDEN.

STEERING DEVICE FOR MOTOR-PROPELLED PLOWS.

1,262,625.

Specification of Letters Patent. Patented Apr. 16, 1918.

Application filed June 2, 1915. Serial No. 31,696.

*To all whom it may concern:*

Be it known that we, DAVID WERNER BERLIN, Stockholm, Sweden, and OTTO EDVARD HULTBERG, Guldsmedshyttan, Sweden, subjects of the King of Sweden, have invented certain new and useful Improvements in Steering Devices for Motor-Propelled Plows, of which the following is a specification.

In the motor-propelled plows hitherto known the operator always has had his place on a point upon the machine, from where he has steered the machine with aid of a wheel. In consequence of this the operator has not been able to control the work of the plow-shares in the mark, which is a great inconvenience. Especially when working in stony soil it is very important that the operator carefully observe the work of the shares in the mark. The invention consists therein, that a lever mechanism is arranged on the front wheel or wheels, from which lever mechanism a steering lever extends backward, this steering lever being so long that the operator can go behind the machine and steer the same. The present invention is shown in the drawings applied to a plow with but one front wheel, but it is understood that the herein described lever mechanism is not limited to such a form but can be applied to a plow with a plurality of front wheels. Besides the said advantage the present arrangement is very simple and enables the production of a relatively cheap plow.

A constructional form of the invention is illustrated on the accompanying drawing, in side view in Figure 1 and a plan view in Fig. 2.

Fig. 3 is an enlarged side view of the lever mechanism.

Fig. 4 is an enlarged plan view of the lever mechanism.

According to the invention the front wheel is provided with a lever mechanism which in the form shown on the drawing consists of a transverse lever 2, fixed on an upright pin 1 carried by the framework of the front wheel and with the aid of links 3 pivotally connected with an arm 4, pivoted on the fore part of the frame 6 of the machine. The end 10 of the steering shaft 8 is pivoted upon the fore part of the arm 4 and the upper end of the upright pin 1.

When the steering shaft 8 is turned to the right or left the fore end 10 of the steering lever is displaced to the opposite side. This end 10 is pivoted upon a pin which is carried by a forward extension of the arm 4, and this arm turns as far as the fore end of the steering shaft, carrying arms 3 with it. Arms 3 are pivoted to the arm 2 fixed on the upright pin 1. This arrangement enables the steering wheel to turn farther than would have been the case had the steering shaft been directly connected to the upright pin. In Fig. 4 is shown in dotted lines the position of the parts, when the turning is executed.

We claim:

1. In a plow having a steering-wheel, steering mechanism comprising a framework for said wheel, a transverse member fixedly attached to said framework, a second transverse member pivoted upon a stationary fulcrum, links pivotally connected to said transverse members and a steering-lever having a stationary fulcrum and connected to and operating said second transverse member.

2. In a plow having a steering-wheel, steering mechanism comprising a pin fixed to the framework of said wheel, a transverse member centrally fixed on said pin, a second transverse member pivoted to the framework of the plow, longitudinal members pivotally connecting said transverse members and a steering-lever having a stationary fulcrum and connected to and operating said second transverse member.

3. In a plow having a steering-wheel, steering mechanism comprising a pin fixed to the framework of said wheel, a transverse member centrally fixed on said pin, a second transverse member pivoted to the framework of the plow, longitudinal members pivotally connecting said transverse members and a steering-lever pivoted upon said pin and connected to and operating said second transverse member.

4. In a plow having a steering-wheel, steering mechanism comprising a pin fixed to the framework of said wheel, a transverse member centrally fixed on said pin, a second transverse member pivoted to the framework of the plow, longitudinal members pivotally connecting said transverse members and an oscillative steering-lever operated from the rear of the machine, and connected to said second transverse member.

5. In a plow having a steering-wheel, steering mechanism comprising a pin fixed to move with said wheel, a transverse member fixed on said pin, a second transverse member pivoted upon a stationary fulcrum, links pivotally connecting the ends of said transverse members, and a steering-lever having a stationary fulcrum and connected to and operating said second transverse member.

In testimony whereof we have signed our names to this specification in the presence of two subscribing witnesses.

DAVID WERNER BERLIN.
OTTO EDVARD HULTBERG.

Witnesses:
J. HENENSTURM,
GRETA PRIEN.

Copies of this patent may be obtained for five cents each, by addressing the "Commissioner of Patents, Washington, D. C."